United States Patent [19]

Hafner et al.

[11] Patent Number: 5,492,098
[45] Date of Patent: Feb. 20, 1996

[54] FLEXIBLE INJECTION RATE SHAPING DEVICE FOR A HYDRAULICALLY-ACTUATED FUEL INJECTION SYSTEM

[75] Inventors: Gregory G. Hafner, Normal, Ill.; Xiangying Liu, Ann Arbor, Mich.

[73] Assignee: Caterpillar Inc., Peoria, Ill.

[21] Appl. No.: 24,543

[22] Filed: Mar. 1, 1993

[51] Int. Cl.⁶ .................... F02M 37/04; F02B 3/00
[52] U.S. Cl. .................... 123/446; 123/506; 123/299
[58] Field of Search .................... 123/446, 467, 123/299, 501, 502, 506, 300

[56] References Cited

U.S. PATENT DOCUMENTS

| | | | |
|---|---|---|---|
| Re. 33,270 | 7/1990 | Beck et al. | 123/447 |
| 356,818 | 6/1943 | Links et al. | |
| 2,547,174 | 4/1951 | Rogers | 103/41 |
| 3,792,692 | 2/1974 | Kiley | 123/32 G |
| 4,393,847 | 7/1983 | May | 123/467 |
| 4,407,250 | 10/1983 | Eheim et al. | 123/467 |
| 4,476,835 | 10/1984 | Laufer | 123/467 |
| 4,627,571 | 12/1986 | Kato et al. | 123/467 |
| 4,784,101 | 11/1988 | Iwanaga et al. | 123/467 |
| 4,838,232 | 6/1989 | Wich | 123/506 |
| 4,878,471 | 11/1989 | Fuchs | 123/466 |
| 4,979,674 | 12/1990 | Taira et al. | 123/467 |
| 5,020,979 | 6/1991 | Askew | 417/499 |
| 5,036,821 | 8/1991 | Horiuchi et al. | 123/506 |
| 5,074,766 | 12/1991 | Kochanowski | 123/299 |
| 5,121,730 | 6/1992 | Ausman et al. | 123/467 |
| 5,156,132 | 10/1992 | Iwanaga | 123/467 |
| 5,176,120 | 1/1993 | Takahashi | 123/467 |
| 5,241,935 | 9/1993 | Beck et al. | 123/467 |
| 5,261,366 | 11/1993 | Regueiro | 123/299 |

FOREIGN PATENT DOCUMENTS

| | | |
|---|---|---|
| 0149598A2 | 1/1985 | European Pat. Off. |
| 1007913 | 5/1952 | France ................ 123/506 |

Primary Examiner—Thomas N. Moulis
Attorney, Agent, or Firm—Loyal O. Watts; Anthony N. Woloch

[57] ABSTRACT

An apparatus for variably controlling the fuel flow characteristics of a hydraulically-actuated injector during an injection cycle. The apparatus includes variable control of actuating fluid pressure and a spill control apparatus associated with the plunger and barrel assembly of the injector. The apparatus can control the initial rate of fuel injection and also provide continuous or split injection throughout the load and speed range of an engine. Performance is controlled by the geometry of the spill control apparatus along with the variably controlled pressure of the actuating fluid supplied to the injector. The apparatus helps reduce engine noise and emissions.

19 Claims, 6 Drawing Sheets

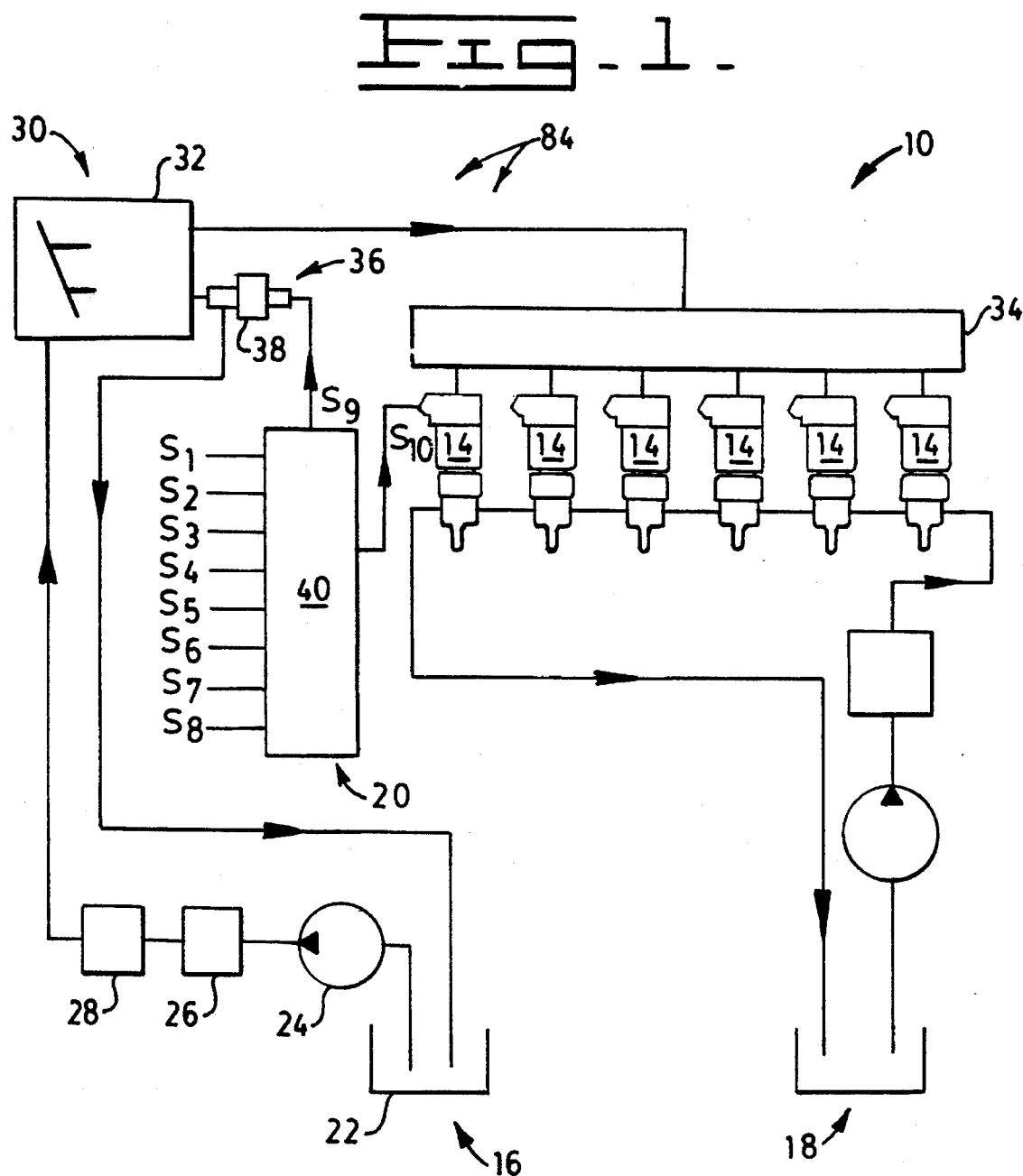

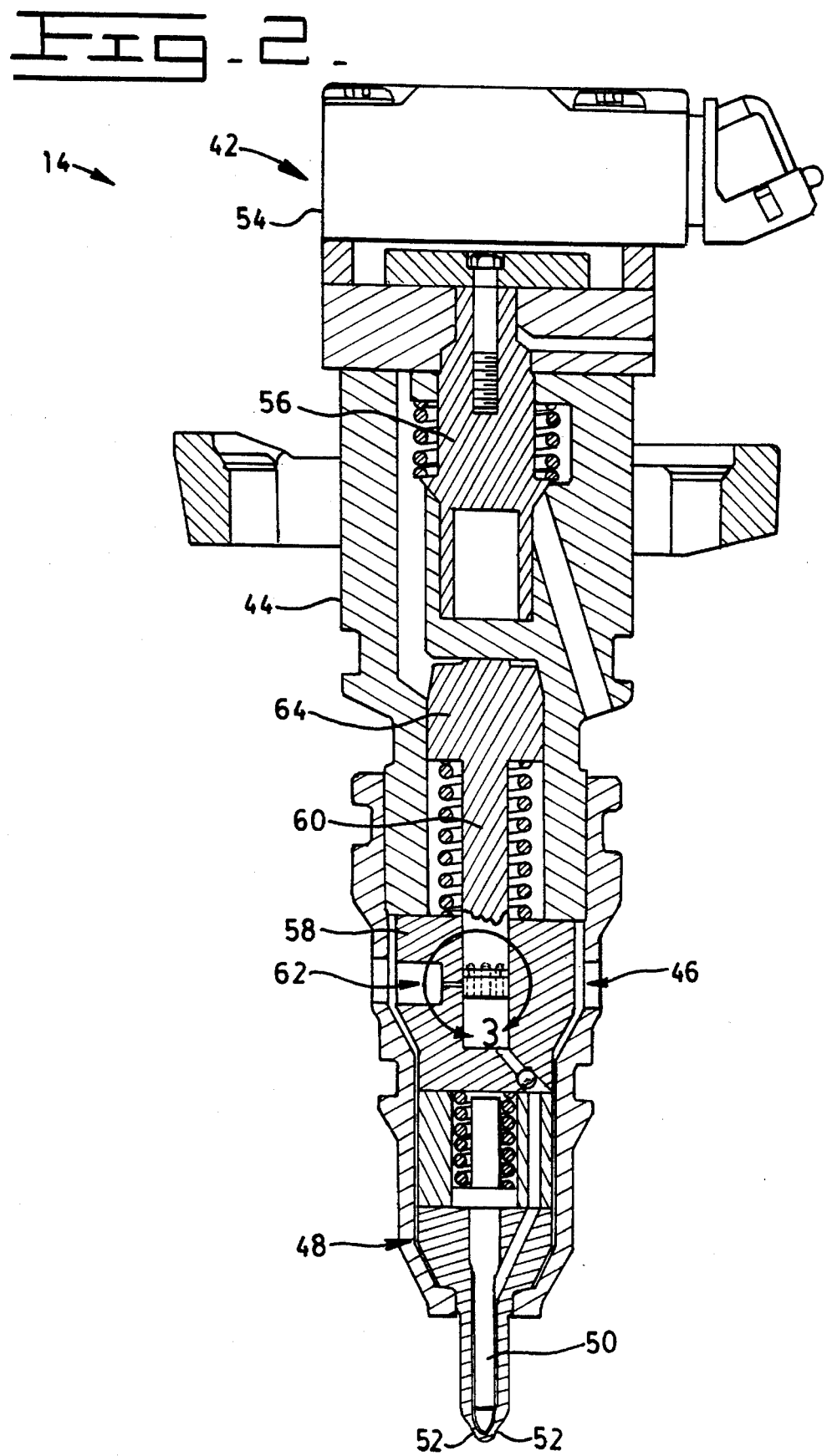

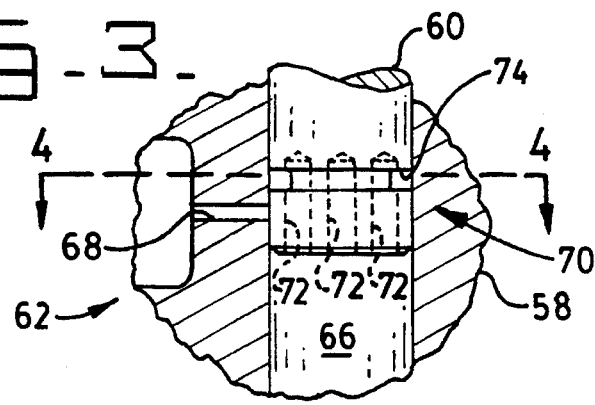
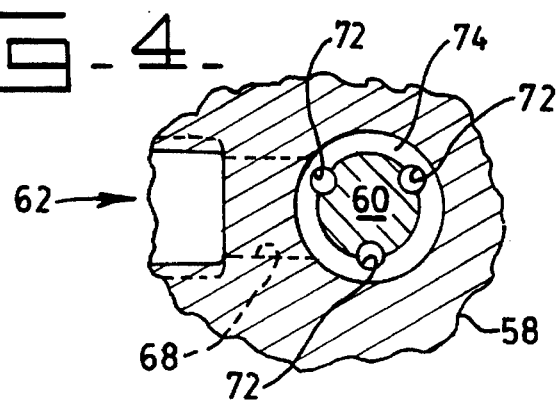
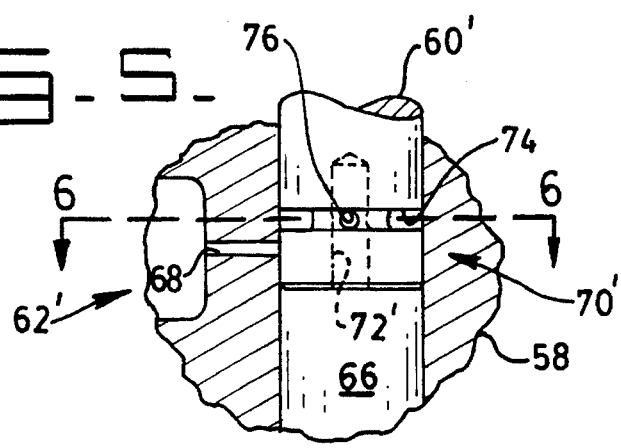
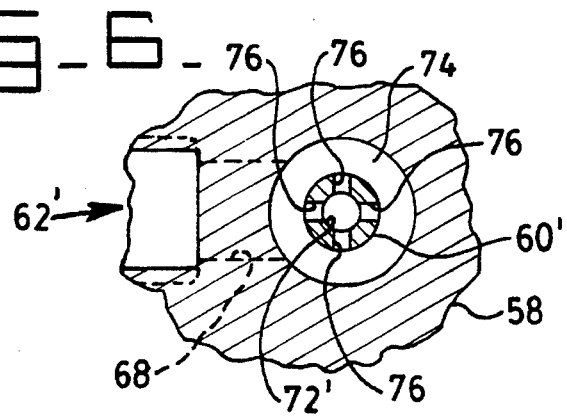

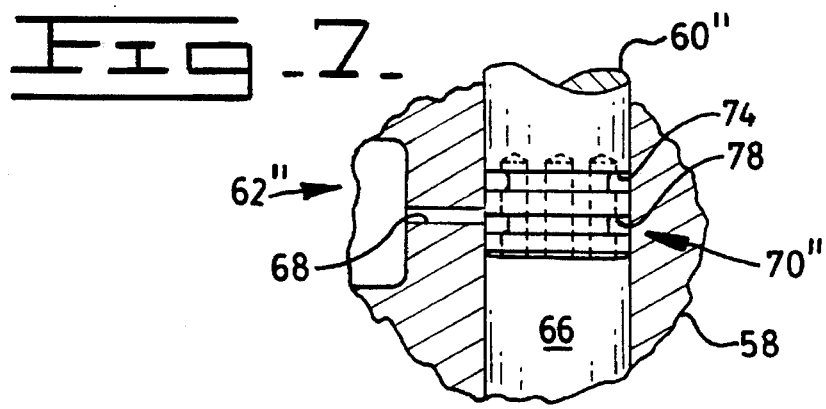
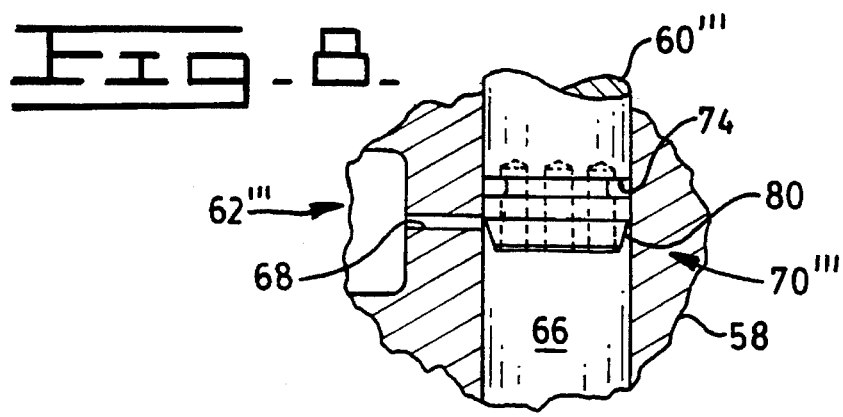
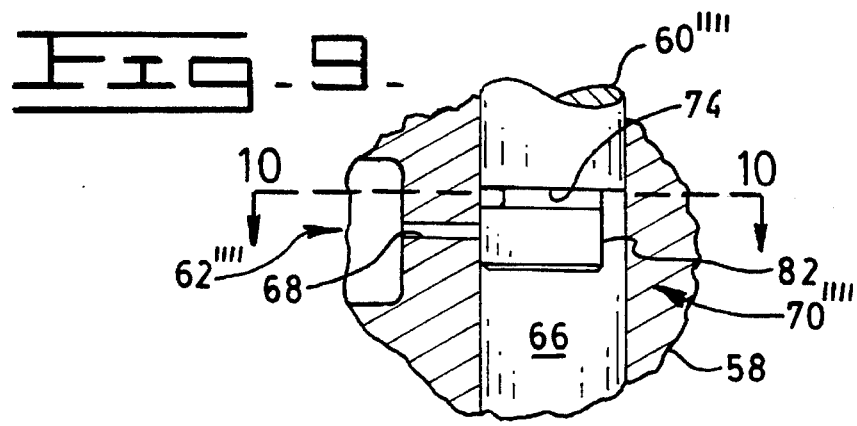
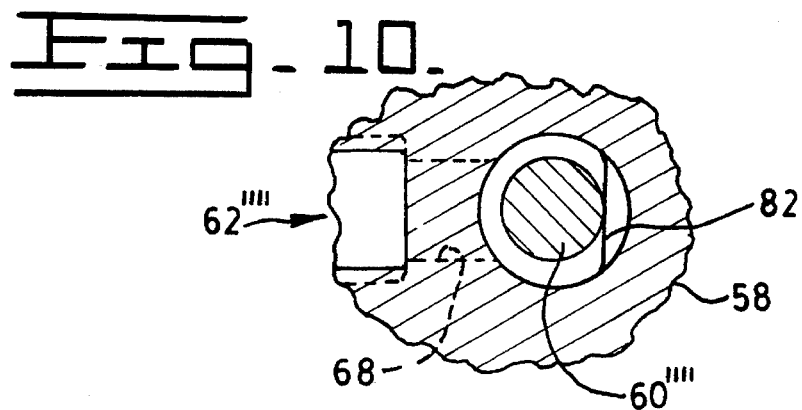

FLEXIBLE INJECTION RATE SHAPING DEVICE FOR A HYDRAULICALLY-ACTUATED FUEL INJECTION SYSTEM

TECHNICAL FIELD

The present invention relates generally to hydraulically-actuated fuel injection systems and, more particularly, to devices for shaping the fuel injection delivery characteristics of such systems.

BACKGROUND ART

Fuel injection rate shaping is a process of tailoring the initial portion of fuel delivery to control the amount of fuel delivered during the ignition delay portion and the main injection portion of an injection cycle. This process modifies the heat release characteristics of the combustion process and is beneficial in achieving low emission and noise levels.

Rate shaping devices for conventional mechanically-driven fuel systems may be classified as one of three types: restrictive, retractive, or spill control. Restrictive devices cause a pressure drop of the injection fuel, resulting in lower injection pressure. Retractive devices temporarily store fuel during the initial portion of injection, while spill control devices spill or bleed a portion of the fuel flow from the high pressure fuel injection circuit.

Known spill control devices, associated with a fuel pump plunger reciprocated in synchronism with rotation of an engine, are shown in U.S. application Ser. No. 356,818 by Links et al. published on Jun. 1, 1943, U.S. Pat. No. 2,547,174 issued to Rogers on Apr. 3, 1951, U.S. Pat. No. 3,792,692 issued to Kiley on Feb. 19, 1974, and U.S. Pat. No. 5,020,979 issued to Askew on Jun. 4, 1991. In such devices, the flow of fuel sprayed by a fuel injection nozzle is temporarily interrupted or reduced by spilling a portion of fuel from a high pressure plunger chamber. The fuel is spilled when a certain control edge or port on the reciprocal plunger communicates with a certain control edge or port in a stationary barrel or housing surrounding the plunger.

Although the general effects of rate shaping are well known, the trade-offs with overall engine performance are not generally known. This is partly due to the fact that, with a mechanically-driven fuel pump plunger, the fuel system rate shaping characteristics are limited in operating range, that is, they are dependent on engine load and speed. An engine operating over a large speed range will likewise vary the speed of the mechanically-driven fuel pump plunger. Consequently, there is usually only one satisfactory engine operating condition at which the rate shaping device provides satisfactory or optimum benefits.

U.S. Pat. No. 5,121,730 issued to Ausman et al. on Jun. 16, 1992 shows a hydraulically-actuated fuel injector system in which the fuel pump plunger of each injector is hydraulically actuated or driven by a source of pressurized actuating fluid. This system has some inherent injection rate shaping capability compared to a mechanically-actuated injector having no rate shaping device at all. However, there are times when the amount of injection rate shaping provided in Ausman et al. is lower than desired.

U.S. Pat. No. 4,878,471 issued to Fuchs on Nov. 7, 1989 shows a hydraulically-actuated fuel injector system having an injection rate shaping device. This injection rate shaping device adds a number of components to the basic fuel injection system which undesirably adds complexity and cost. Fuchs requires fluid pressure feedback from the high pressure fuel plunger chamber to control the amount of actuating fluid pressure available to stroke the plunger. Fuchs also requires a pair of valves in the hydraulic control unit for controlling the flow of actuating fluid used to hydraulically actuate the fuel pump plunger associated with each injector. Fuchs also requires a control unit associated with the high pressure fuel injection circuit of the injector.

The present invention is directed to overcoming one or more of the problems as set forth above.

DISCLOSURE OF THE INVENTION

In one aspect of the present invention there is disclosed a hydraulically-actuated electronically-controlled injector fuel system adapted for an engine. The system includes a means for variably providing one of continuous and split injection during a fuel injection cycle independent of engine speed and loading.

In another aspect of the present invention there is disclosed a hydraulically-actuated electronically-controlled injector fuel system adapted for an engine. The system includes a means for varying the time interval between an initial injection portion and a main injection portion of a fuel injection cycle independent of engine speed and loading.

In another aspect of the present invention there is disclosed a hydraulically-actuated electronically-controlled injector fuel system adapted for an engine. The system includes a means for varying the initial rate of fuel injection during an injection cycle independent of engine speed and loading.

BRIEF DESCRIPTION OF THE DRAWINGS

FIG. 1 is a diagrammatic general schematic view of a hydraulically-actuated electronically-controlled injector fuel system for an engine having a plurality of injectors.

FIG. 2 is a diagrammatic isolated enlarged cross-sectional view of a first embodiment of the present invention applied to hydraulically-actuated injector 14 shown in FIG. 1.

FIG. 3 is a diagrammatic enlarged partial view of the plunger and barrel assembly taken within the encircling line 3 of FIG. 2.

FIG. 4 is a diagrammatic cross-sectional view taken along line 4—4 of FIG. 3.

FIG. 5 is a diagrammatic view similar to FIG. 3 but showing a second embodiment of the present invention.

FIG. 6 is a diagrammatic cross-sectional view taken along line 6—6 of FIG. 5.

FIG. 7 is a diagrammatic view similar to FIG. 3 but showing a third embodiment of the present invention.

FIG. 8 is a diagrammatic view similar to FIG. 3 but showing a fourth embodiment of the present invention.

FIG. 9 is a diagrammatic view similar to FIG. 3 but showing a fifth embodiment of the present invention.

FIG. 10 is a diagrammatic cross-sectional view taken along line 10—10 of FIG. 9.

BEST MODE FOR CARRYING OUT THE INVENTION

Figure 11:
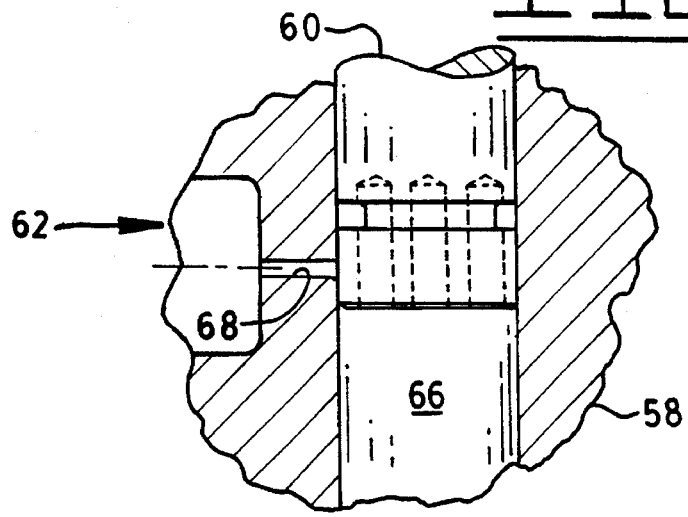
FIG. 11 is diagrammatic view similar to FIG. 3 showing a first position of the plunger 60 during its pumping stroke.

Referring to FIG. 1, wherein similar reference numerals designate similar elements or features throughout FIGS. 2–13, there is shown an embodiment of a hydraulically-actuated electronically-controlled injector fuel system 10 (hereinafter referred to as a HEUI fuel system).

The exemplary HEUI fuel system 10 is shown in FIG. 1 as adapted for a direct-injection diesel-cycle internal combustion engine. While the embodiment of FIG. 1 applies to an in-line six cylinder engine, it should be understood that the present invention is also applicable to other types of engines, such as vee-type engines and also rotary engines, and that the engine may contain fewer or more than six cylinders or combustion chambers.

Referring again to FIG. 1, The HEUI fuel system 10 includes one or more hydraulically-actuated electronically-controlled injectors 14, such as unit pump-injectors, each associated with a respective combustion chamber of the engine. The system 10 further includes apparatus or means 16 for supplying hydraulically actuating fluid to each injector 14, apparatus or means 18 for supplying fuel to each injector 14, and apparatus or means 20 for electronically controlling at least the fuel injection quantity, injection timing, and/or actuating fluid pressure of the HEUI fuel system 10. Further details the exemplary HEUI fuel system 10, not discussed here, are disclosed in U.S. Pat. No. 5,191,867 issued to Glassey et al. on Mar. 9, 1993.

The hydraulically actuating fluid supplying means 16 preferably includes an actuating fluid sump 22, a relatively low pressure actuating fluid transfer pump 24, an actuating fluid cooler 26, one or more actuating fluid filters 28, a source of high pressure actuating fluid or means 30 for pressuring actuating fluid such as a high pressure actuating fluid pump 32, at least one relatively high pressure actuating fluid manifold 34 arranged in fluid communication between the pressurizing means 30 and each of the injectors 14, and apparatus or means 36 for variably controlling the magnitude of the pressure of actuating fluid in the manifold 34.

Preferably, the pump 32 is a gear-driven fixed-displacement axial piston pump and the means 36 is an electronically-controlled proportional pressure control valve 38 or rail pressure control valve (hereinafter called the RPCV) which selectively bypasses a variable amount of actuating fluid from the relatively high pressure pump 32 back to the relatively low pressure sump 22. Alternatively, the pump 32 may be a variable-displacement axial piston pump and the RPCV 38 may be eliminated.

Preferably, the fluid chosen for the actuating fluid is not fuel but is a relatively incompressible liquid having a relatively higher viscosity than fuel under the same conditions. Preferably, the actuating fluid is engine lubricating oil and the actuating fluid sump 22 is an engine lubrication oil sump. In the embodiment of FIG. 1, the pump 32 increases the actuating fluid pressure level from a typical engine operating oil pressure level to the actuation pressure level required by the injectors 14. The RPCV 38 is electronically controlled by the means 20 to control the actuating fluid pressure effectively provided by the pump 32 to the manifold 34. The RPCV 38 selectively causes a variable portion of the actuating fluid pressurized by pump 32 to bypass the manifold 34 and return directly back to the sump 22.

The means 20 for electronically controlling the fuel injection quantity, injection timing, and/or actuating fluid pressure of the HEUI fuel system 10 is preferably a digital microprocessor or electronic control module 40 hereinafter referred to as the ECM.

The ECM 40 contains software decision logic and information defining optimum fuel system operational parameters and controls key components. One or more sensor signals ($S_1$–$S_8$), indicative of various engine parameters are delivered to the ECM 40 to identify the engine's current operating condition. The ECM 40 uses these input signals to control the operation of the fuel system in terms of fuel injection quantity, injection timing, and actuating fluid pressure.

An exemplary software decision logic will now be discussed for determining the magnitude of the actuating fluid pressure supplied to the injector 14. This logic preferably uses at least four inputs: actual engine speed, desired fuel quantity, actual actuating fluid pressure and actuating fluid viscosity which may be directly or indirectly sensed.

Preferably, at least an actual engine speed signal, a desired fuel quantity signal, and an actuating fluid viscosity signal are the inputs for an actuating fluid pressure map and/or equation(s). Alternatively, an air inlet pressure signal may be added as an input. Based on these three or more input signals, a desired actuating fluid pressure signal is selected as an output. This desired actuating fluid pressure signal then is compared with an actual actuating fluid pressure signal to produce an actuating fluid pressure error signal. This actuating fluid pressure error signal and the desired actuating fluid pressure signal become the inputs for a set of mathematical equations and/or maps called the RPCV control algorithm whose output is a desired electrical current.

This desired electrical current $S_9$ is applied to a solenoid operated valve or, alternatively, some other type of electrically-actuated valve in the RPCV 38. By changing the electrical current to the RPCV 38, the actuating fluid pressure can be increased or decreased. For example, increasing the current to the RPCV 38 causes the RPCV 38 to bypass the actuating fluid directly to the sump 22 at a higher pressure thereby increasing the actuating fluid pressure in the manifold 34. Decreasing the current to the RPCV 38 causes the RPCV 38 to bypass more actuating fluid to the sump 22 at a lower pressure thereby decreasing the actuating fluid pressure in the manifold 34. This RPCV control algorithm calculates the electrical current to the RPCV 38 that would be needed to raise or lower the actuating fluid pressure to result in a zero actuating fluid pressure error signal. The resulting actuating fluid pressure in the manifold 34 is used to hydraulically actuate the injector 14. Preferably, the raw actuating fluid pressure signal, sensed in the high pressure portion of the actuating fluid pressure circuit such as in the manifold 34, is conditioned by conventional means to eliminate noise and convert the signal into a form usable by the ECM 40.

Referring to FIG. 2, the injector 14 is preferably a hydraulically-actuated unit pump-injector. The injector 14 generally includes an electrical actuator and control valve assembly 42, a body 44, a plunger and barrel assembly 46, and an injection nozzle assembly 48 having a movable flow check 50 and one or more fuel spray orifices 52. Alternatively, instead of a unit pump-injector, one or more of the assembly 42, assembly 46, and/or assembly 48 may be a separate remotely spaced component arranged in fluid communication as needed.

The actuator and valve assembly 42 serves as a means or device for selectively communicating relatively high pressure actuating fluid from the manifold 34 to the respective injector 14 in response to receiving an electrical control signal from the ECM 40. The assembly 42 includes an electrical actuator 54 and a single actuating fluid control valve 56. For example, the actuator 54 may be an on/off-type solenoid and the valve 56 may be a poppet valve connected to a movable armature of the solenoid.

The plunger and barrel assembly 46 includes a barrel 58, a reciprocal fuel pump plunger 60, and a spill control means 62 for temporarily or intermittently spilling fuel during the pumping stroke of the plunger 60. The spill control means 62 spills a portion of fuel contained in the high pressure fuel circuit of the injector 14 between the plunger 60 and the injection nozzle assembly 48. FIG. 2 shows an actuating fluid piston 64 integrally connected to the plunger 60. Alternatively, the piston 64 may be a separate movable component positioned adjacent to the plunger 60 as shown, for example, in U.S. Pat. No. 5,121,730 issued to Ausman et al. on Jun. 16, 1992. Preferably, the actuating fluid piston 64 has a larger effective diameter than the fuel pump plunger 60 in order to effect pressure intensification of the fuel contained in the high pressure fuel pump chamber 66 and the rest of the high pressure fuel circuit leading to the spray orifices 52. Alternatively, the effective diameters of the piston 64 and the plunger 60 may be the same.

Preferably, the spill control means 62 temporarily or intermittently spills a portion of the fuel from the high pressure pump chamber 66, defined by the plunger and barrel bore, during each downward or pumping stroke of the plunger 60. Various embodiments of the spill control means 62 will now be discussed. The embodiments shown in FIGS. 2-8 are applicable to both a freely rotatable fuel pump plunger 60 as well as a non-rotatable fuel pump plunger. The embodiment shown in FIGS. 9-10 is applicable for only a non-rotatable fuel pump plunger or one with controlled rotation.

Referring to FIGS. 2-4, a first embodiment of the spill control means 62 is shown. The spill control means 62 includes at least one spill port 68 defined in the barrel 58 and spill passage means 70 defined in the movable plunger 60 for intermittently communicating a portion of fuel from the pump chamber 66 with the spill port 68 during the pumping stroke of the plunger 60. The spill port 68 intersects the bore of the barrel 58 in which the plunger 60 reciprocates. The spill port 68 also communicates with a relatively low pressure fuel circuit of the fuel supplying means 18. Preferably, the spill port 68 of the barrel 58 has a rectangular cross-sectional area and is arranged so that the longest sides of the rectangle are positioned perpendicular to the reciprocal motion of the plunger 60. This orientation ensures that the spill port 68 is rapidly uncovered by the spill passage means 70 of the movable plunger 60 during such intermittent communication. Alternatively, the spill port 68 may be of one of various other cross-sectional shapes, such as circular.

In the first embodiment of FIGS. 2-4, the spill passage means 70 includes one or more internal axial passages 72 defined in the plunger 60 and an outer circumferential groove or annular slot 74 encircling the plunger 60 which is preferably generally cylindrical in shape. The groove 74 is spaced from the leading edge of the plunger 60 that faces the fuel pump chamber 66. As shown in FIG. 4, the passages 72 are preferably evenly spaced from one another about an imaginary circle lying at a predetermined radius from the central axis of the plunger 60. The passages 72 are arranged in continuous fluid communication between the fuel pump chamber 66 and the circumferential groove 74. The circumferential groove 74 is arranged and sized to be in continuous fluid communication with each of the passages 72. Preferably the groove 74 at least partially intersects all of the passages 72. The groove 74 is also arranged to be in intermittent fluid communication with the spill port 68 of the barrel 58 during the pumping stroke of the plunger 60.

The axial distance between the upper edge (i.e., furthest from the fuel pump chamber 66) of the spill port 68 and the leading edge (i.e., closest to the fuel pump chamber 66) of the circumferential groove 74 helps control the initial rate of fuel injection during an injection cycle. By changing this geometry of the plunger and barrel, the quantity of fuel injected during the initial injection portion of the injection cycle can be varied.

Referring to FIGS. 5-6, a second embodiment of a spill control means 62' is shown. The spill control means 62' includes at least one spill port 68 similar to the first embodiment of FIGS. 2-4. However, in the second embodiment, the spill passage means 70' includes a single internal axial passage 72' centrally defined in the plunger 60', one or more radially extending passages 76, and an outer circumferential groove or slot 74 spaced from the leading edge of the plunger 60' that faces the fuel pump chamber 66. As shown in FIG. 5, the passage 72' is arranged in continuous fluid communication between the fuel pump chamber 66 and the radial passages 76. As shown in FIG. 6, all of the radial passages 76 are arranged in continuous fluid communication with the passage 72' by intersection therewith and are preferably evenly spaced from one another. The circumferential groove 74 is arranged and sized to be in continuous fluid communication with each of the radial passages 76, by intersection therewith. The groove 74 is also arranged to be in intermittent fluid communication with the spill port 68 of the barrel 58 during the pumping stroke of the plunger 60'.

Referring to FIG. 7, a third embodiment of the spill control means 62" is shown. The spill control means 62" is similar to the first embodiment of FIGS. 2-4 except that the spill passage means 70" further includes another outer circumferential groove 78 positioned between the first groove 74 and the leading edge of plunger 60". The groove 78 is arranged to communicate the fuel pump chamber 66 with the spill port 68 when the plunger 60" is fully retracted or begins its pumping stroke as shown in FIG. 7. The groove 78 is intended to eliminate the need to control the axial position of the movable plunger 60" relative to the spill port 68 of the barrel 58 during assembly. No fuel injection occurs until the top or trailing edge of the groove 78 crosses the bottom edge (i.e., closest to the fuel pump chamber 66) of the spill port 68. Stated another way, no fuel injection occurs until the bottom or leading edge (relative to the fuel pump chamber 66) of the second land of the plunger 60" crosses the bottom edge (i.e., closest to the fuel pump chamber 66) of the spill port 68. After this happens, the spill control means 62" begins to operate similar to the embodiment of FIG. 2.

Referring to FIG. 8, a fourth embodiment of the spill control means 62''' is shown. The spill control means 62''' is similar to the first embodiment of FIGS. 2–4 except that the spill passage means 70''' further includes a relatively large chamfer 80 at the leading edge of the plunger 60''' facing the fuel pump chamber 66. The chamfer 80 is arranged to communicate the fuel pump chamber 66 with the spill port 68 when the plunger 60''' is fully retracted or begins its pumping stroke as shown in FIG. 8. The chamfer 80 is again intended to eliminate the need to control the position of the plunger 60''' relative to the spill port 68 of the barrel 58 during assembly. No fuel injection occurs until the lower or leading edge of the first land (i.e., closest to the fuel pump chamber 66) of the plunger 60" crosses the bottom edge of the spill port 68. After this happens, the spill control means 62''' begins to operate similar to the embodiment of FIG. 2.

Referring to FIGS. 9–10, a fifth embodiment of the spill control means 62'''' is shown. The spill control means 62'''' includes at least one spill port 68 and a circumferential groove 74 similar to the first embodiment of FIGS. 2–4. However, in the fifth embodiment, the spill passage means 70'''' includes at least one outer peripheral axial slot or groove 82 spaced from the spill port 68 and arranged to intersect or be in continuous fluid communication between the fuel pump chamber 66 and the circumferential groove 74. Alternatively, the embodiment of FIGS. 9–10 may have another circumferential groove 78 or chamfer 80 similar to the third embodiment (FIG. 7) or fourth embodiment (FIG. 8), respectively.

In all of the above embodiments, the spill control means 62, associated with the barrel 58 and the hydraulically-actuated fuel pump plunger 60, the electronic control means 20, and the actuating fluid pressure controlling means 36 collectively serve as a flexible means 84 (FIG. 1) for variably controlling the fuel injection rate (i.e., fuel injection flow versus time profile) of an injection cycle.

Industrial Applicability

Referring to FIG. 1, the actuating fluid circuit 16 consists of a low pressure section and a high pressure section. The low pressure circuit may, for example, operate at a pressure of about 0.3 MPa (44 psi). Its function is to provide filtered actuating fluid, preferably in the form of lubricating oil, to the high pressure actuating fluid pump 32 as well as the lubricating oil system of the engine 12. The transfer pump 24 draws oil from the engine oil sump 22 and supplies it through the oil cooler 26 and filter 28 to both the engine 12 and the high pressure actuating fluid pump 32.

The high pressure actuating fluid circuit provides actuation fluid to the injector 14 and operates in a pressure range, for example, from about 4 to 23 MPa (about 580 to 3300 psi). This high pressure actuating fluid flows through lines into the manifold 34 located near the injectors 14. The manifold 34 stores the actuating fluid at a variable actuation pressure ready for injector operation. Preferably, actuating fluid is discharged from the injector 14 under the engine valve cover (not shown) so that no return lines are required.

The ECM 40 variably controls the pressure in the high pressure actuating fluid circuit 16 and thus variably controls the pressure of fuel injected by the injectors 14 independent of engine speed. Operational maps and/or mathematical equations stored in the ECM programmable memory identify the optimum actuating fluid pressure in the manifold or rail 34 for optimum engine performance.

Many design concepts were studied to identify a flexible fuel injection rate shaping device which would operate satisfactorily at a wide range of engine speed and load conditions. Variable restriction devices were not deemed suitable for the HEUI fuel system because of reflected pressure waves generated from the restriction, regardless of whether the restriction was located on the fuel or actuating fluid side of the injector. Retractive devices were not deemed suitable because, generally, they are complicated, offer only a limited range of operation, and can cause an undesirable slowing of the end of injection during an injection cycle.

One of the unique capabilities of the HEUI fuel system 10 is its ability to be tuned by varying the design of system components. Applicants' present invention provides flexible fuel injection rate shaping across the entire load and speed range of engine operation. The means 84 may be implemented and tuned for an engine combustion system in order to achieve desirable engine performance characteristics.

Preferably, the spill control means 62 is a precision ported spill control device located in the plunger and barrel assembly that adds no additional components to the basic hydraulically-actuated injector 14. Since fuel injection timing of the injector 14 is controlled by the ECM 40 and assembly 42 completely independent of the initial position of the plunger 60, only one controlling edge needs to be manufactured with precision.

In combination with the independent fuel injection pressure control of the HEUI fuel system 10, engine performance can be optimized by varying the idle and light load rate characteristics, independent of rated and high load conditions. The resulting benefits to performance, noise, and emissions generally will depend on the particular engine and the objectives of the engine manufacturer.

Figure 14:
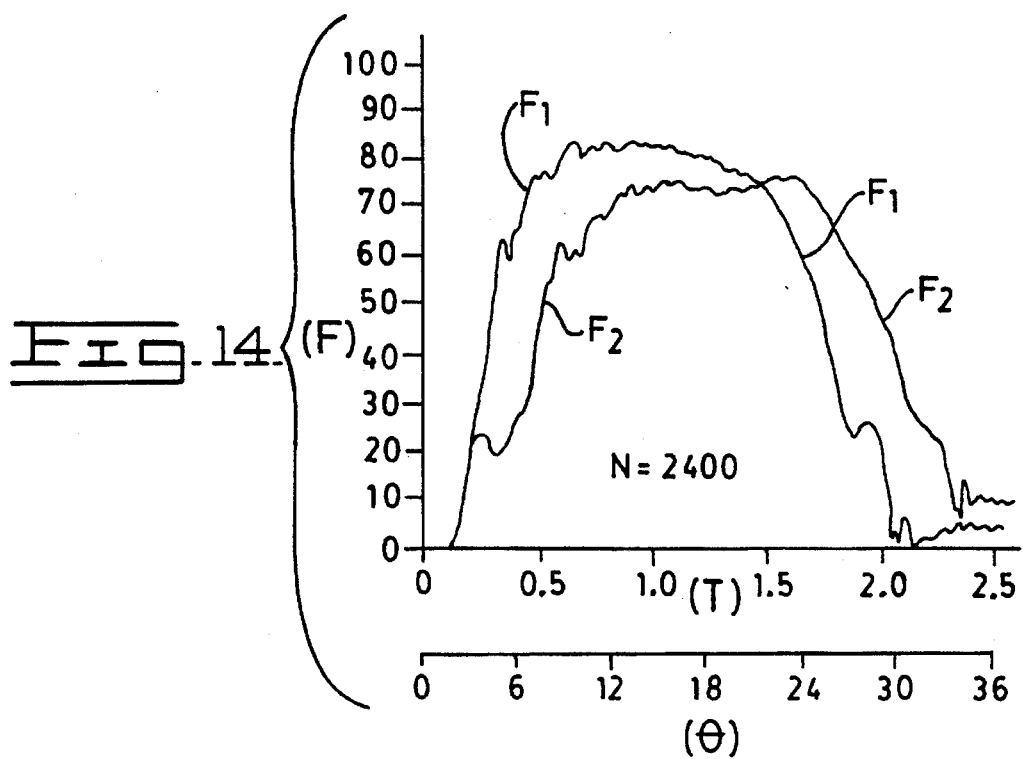
FIG. 14 is a diagrammatic graph which shows comparative results of actual laboratory bench tests measuring fuel injection flow (F) versus time (T) or engine crankshaft degrees (theta) for a hydraulically-actuated injector. Curve $F_1$ shows the performance of the injector without the present invention and curve $F_2$ shows the performance of the injector with the present invention. These tests were run at a constant rated engine speed. The total fuel delivery per injection cycle is held about the same in the two curves of this graph. The actuating fluid pressure is also held about the same in the two curves.

FIG. 14 is a diagrammatic graph which shows comparative results of actual laboratory bench tests measuring fuel injection flow (F) versus time (t) or engine crankshaft degrees (theta) for a hydraulically-actuated injector. The curve ($F_1$) represents an injector without any spill-type rate shaping device and the curve ($F_2$) represents an injector having the first embodiment of the spill control means 62 shown in FIGS. 2–4. Fuel flow (F) is measured in cubic millimeters per millisecond ($mm^3$/msec) and time (t) is measured in milliseconds (msec). These tests were run at a constant rated engine crankshaft speed of about 2400 revolutions per minute (rpm). The total fuel flow per injection cycle was held about the same in each test or curve of FIG. 14 and was about 120 $mm^3$ (about 0.0073 cubic inches or $in^3$). This fuel flow was controlled by the amount of "on time" that the injector solenoid 54 was electrically energized. The "on time" for each curve in FIG. 14 is different from each other in order to provide about the same total fuel flow per injection cycle. The actuating fluid pressure was also held about the same in the two tests or curves of FIG. 14 and was about 21 mega pascals or MPa (about 3046 pounds per square inch or psi).

Figure 15:
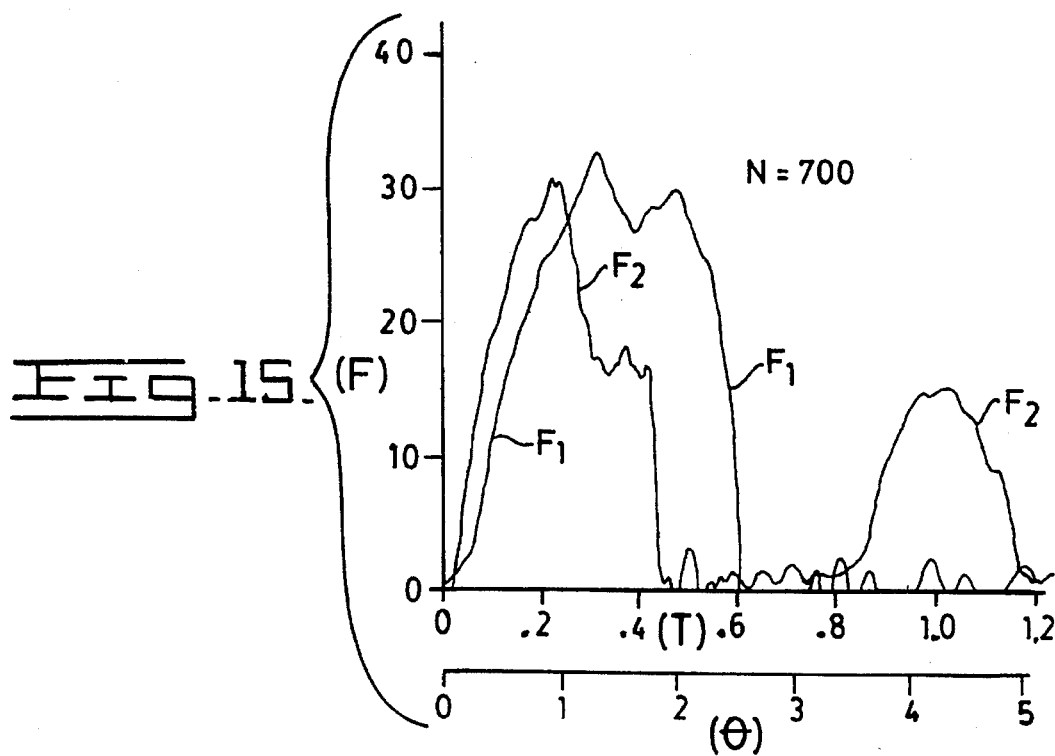
FIG. 15 is a diagrammatic graph similar to FIG. 14 but showing the results of similar tests run at a constant idle engine speed. The total fuel delivery per injection cycle is held about the same in each of the two curves of this graph. Moreover, the actuating fluid pressure is different in the two curves of this graph.

FIG. 15 is a diagrammatic graph similar to FIG. 14 but showing the results of similar tests run at a constant idle engine crankshaft speed of about 700 rpm. The total fuel flow per injection cycle is about the same in each test or curve of FIG. 15. This fuel flow was controlled by the amount of "on time" that the injector solenoid 54 was electrically energized. The "on time" for each curve in FIG. 15 is different from each other. The total fuel flow was about 13 mm³ (about 0.00079 in³) in curve $F_1$. The total fuel flow was about 12 mm³ (about 0.00073 in³) in curve $F_2$. Note that the actuating fluid pressure was different for each of the two curves of FIG. 15. The actuating fluid pressure was about 4.5 MPa (about 653 psi) in curve $F_1$ of FIG. 15 whereas the actuating fluid pressure was about 6.0 MPa (about 870 psi) in curve $F_2$ of FIG. 15.

Figure 12:
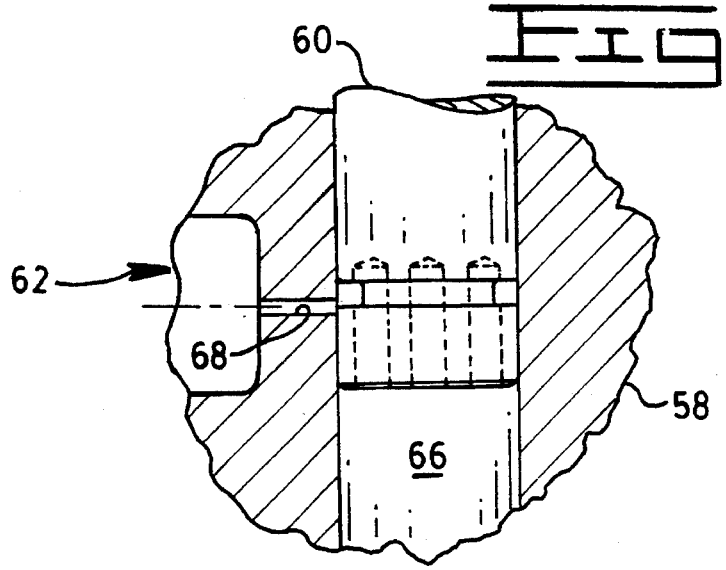
FIG. 12 is diagrammatic view similar to FIG. 3 showing a second position of the plunger 60 during its pumping stroke.
Figure 13:
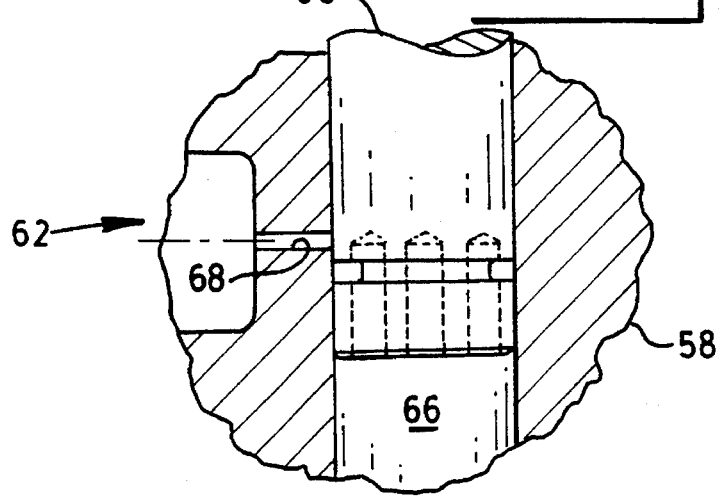
FIG. 13 is diagrammatic view similar to FIG. 3 showing a third position of the plunger 60 during its pumping stroke.

FIGS. 11–13 show the operation of the first embodiment of the spill control means 62 shown in FIGS. 2–4. When the plunger 60 is fully retracted as shown in FIG. 2 and 11, the first or leading land of the plunger 60 covers the spill port 68 of the barrel 58. Referring to FIGS. 1–2, when the ECM 40 energizes the solenoid 54 of a respective injector 14, the control valve 56 is pulled off its high pressure seat to admit high pressure actuating fluid into the injector 14. The actuating fluid hydraulically actuates or directly drives the piston 64 and consequently the plunger 60 downwardly to begin a pumping stroke. Fuel in the fuel pump chamber 66 is compressed by the plunger 60 so that fuel pressure increases in the pump chamber 66. When the increasing pressure of this fuel reaches the valve opening pressure of the injection nozzle assembly 48, the check 50 unseats to begin the initial injection of fuel through the spray orifices 52. Referring to the exemplary curve $F_2$ in FIG. 14, at a rated speed, the change in the initial rate of fuel injection begins where the curve $F_2$ first branches away from the curve $F_1$. Referring to the exemplary curve $F_2$ in FIG. 15, at an idle speed, the initial injection portion is represented by the first hump (extending from about 0 to 0.45 msec) of curve $F_2$.

Referring to FIG. 12, as the plunger 60 continues moving (downwardly) on its pumping stroke, the circumferential groove 74 of the plunger 60 temporarily or intermittently communicates with the spill port 68 of the barrel 58 so that a portion of the high pressure fuel in the pump chamber 66 is spilled into the port 68 via the spill passage means 70 of the plunger 60. The fuel pressure in the fuel pump chamber 66 is thereby temporarily or intermittently reduced. Referring to the exemplary curve $F_2$ of FIG. 14, at a rated engine speed of 2400 revolutions per minute (rpm) and a relatively high actuating fluid pressure, the spill control means 62 reduces the initial rate of fuel injection as compared to the curve $F_1$. Referring to the exemplary curve $F_2$ of FIG. 15, at an idle engine speed of 700 rpm and a relatively lower actuating fluid pressure, the spill control means 62 produces a split injection so that there is a predetermined time duration between the initial injection portion and the main injection portion described below.

Referring to FIG. 13, as the plunger 60 continues moving (downwardly) on its pumping stroke, the second or trailing land of the plunger 60 blocks the spill port 68 and the circumferential groove 74 no longer communicates with the spill port 68. The fuel pressure in the fuel pump chamber 66 again rises and the main injection portion of the injection cycle occurs. Referring to the exemplary curve $F_2$ of FIG. 15, at an idle speed and a relatively lower actuating fluid pressure, the spill control means 62 produces a main injection portion of the injection cycle represented by the second hump (extending from about 0.85 to 1.2 msec) of curve $F_2$.

Unlike some rate shaping devices, the subject invention does not significantly affect peak injection pressure. Moreover, referring to curve $F_2$ of FIG. 15, the time interval between the initial injection portion and the main injection portion of an injection cycle can be controlled by varying the magnitude of the actuating fluid pressure used to hydraulically actuate the injector(s) 14. Varying the magnitude of the actuating fluid pressure in turn varies the speed of the fuel injection pump plunger 60. The ECM 40 operates the RPCV 38 in a closed loop control strategy using a rail pressure sensor. Preferably for accuracy, this pressure sensor is located in the actuating fluid manifold and is calibrated at the nominal engine operating temperature. Alternatively, the pressure sensor may be located elsewhere in the high pressure actuating fluid circuit between the actuating fluid pump and the hydraulically-actuated injectors.

As previously mentioned, a mechanically-driven fuel pump plunger generally has only one satisfactory operating condition at which a plunger/barrel spill-type rate shaping device provides benefits. This is because the plunger speed varies with the speed of an engine which may operate over a wide speed range.

The present invention provides a means for selecting whether or not split injection occurs during an injection cycle independent of engine speed and engine loading. Moreover, the present invention provides a means for infinitely varying the magnitude of the time interval between an initial injection portion and a main injection portion of an injection cycle independent of engine speed and engine loading. Moreover, the present invention provides a means for infinitely varying the initial rate of fuel injection during an injection cycle independent of engine speed and engine loading.

Increasing the actuating fluid pressure results in a smaller time interval between the initial injection portion and the main injection portion of an injection cycle. The actuating fluid pressure may be increased high enough so that there is no time interval between the initial injection portion and the main injection portion. Decreasing the actuating fluid pressure results in a larger time interval between the initial injection portion and the main injection portion of an injection cycle.

Referring to curve $F_1$ of FIG. 15, the hydraulically-actuated injector without the present invention produces a whole injection (i.e., not split injection) over a relatively short period of time which undesirably occurs within or at least partly within the ignition delay period of the engine combustion cycle. This results in excessive combustion noise and $NO_x$ emissions. Referring to curve $F_2$ of FIG. 15, the injector with the present invention is capable of extending the time duration of the fuel injection beyond the ignition delay period thereby advantageously reducing combustion noise and $NO_x$ emissions. Engine tests with the present invention show lower combustion noise and lower engine NOx emissions at equivalent soot levels across the whole load and speed range of the engine compared to a hydraulically-actuated fuel system generally disclosed in U.S. Pat. No. 5,121,730 issued to Ausman et al. on Jun. 16, 1992.

The present invention gives the HEUI fuel system more flexibility in operation since the desired time duration of fuel injection over an injection cycle and the initial fuel injection rate is controllable by infinitely varying or adjusting the actuating fluid pressure used to hydraulically actuate the plunger of the injector.

The present invention is much simpler in construction and operation than the relatively complex device disclosed in U.S. Pat. No. 4,878,471 issued to Fuchs on Nov. 7, 1989. The present invention requires only one valve, not two valves as in Fuchs, for controlling the flow of actuating fluid used to hydraulically actuate each injector. The present invention also provides an infinitely variable hydraulic pressure control upstream of each hydraulic control valve associated with each injector. The actuating fluid pressure control of the present invention selectively varies the fuel pump plunger speed and thus selectively varies the hydraulic effect of the plunger and barrel spill porting. This, in turn, selectively varies the resulting fuel injection rate. The present invention does not require high pressure feedback to the hydraulic control valve of the injector allowing this valve to be a simple open or closed valve.

Other aspects, objects, and advantages of this invention can be obtained from a study of the drawings, the disclosure, and the appended claims.

We claim:

1. A hydraulically-actuated electronically-controlled injector fuel system adapted for an engine comprising:
    an injector having a barrel and a hydraulically-actuated fuel pump plunger positioned in a bore of the barrel, said plunger and barrel defining a fuel pump chamber, said plunger adapted to be hydraulically actuated by pressurized actuating fluid: and
    means for variably providing one of continuous initial and main injections at different rates and split injection during a fuel injection cycle independent of engine speed and loading.

2. A hydraulically-actuated electronically-controlled injector fuel system adapted for an engine comprising:
    an injector having a barrel and a hydraulically-actuated fuel pump plunger positioned in a bore of the barrel, said plunger and barrel defining a fuel pump chamber, said plunger adapted to be hydraulically actuated by pressurized actuating fluid; and
    means for varying the time interval between an initial injection portion and a main injection portion of a fuel injection cycle independent of engine speed and loading.

3. A hydraulically-actuated electronically-controlled injector fuel system adapted for an engine comprising:
    an injector having a barrel and a hydraulically-actuated fuel pump plunger positioned in a bore of the barrel, said plunger and barrel defining a fuel pump chamber, said plunger adapted to be hydraulically actuated by pressurized actuating fluid; and
    means for varying the initial rate of fuel injection during an injection cycle independent of engine speed and loading.

4. A hydraulically-actuated electronically-controlled injector fuel system adapted for an engine comprising:
    a source of pressurized hydraulic actuating fluid;
    an injector having a barrel and a hydraulically-actuated fuel pump plunger positioned in a bore of the barrel, said plunger and barrel defining a fuel pump chamber, said plunger adapted to be hydraulically actuated by the actuating fluid;
    means for intermittently spilling fuel from the fuel pump chamber during an injection cycle; and
    means for variably controlling the magnitude of the pressure of the actuating fluid supplied to actuate the plunger.

5. The fuel system of claim 3 wherein said initial fuel rate varying means includes spill control means for temporarily spilling fuel from the fuel pump chamber during a pumping stroke of the plunger and means for variably controlling the magnitude of the pressure of the actuating fluid supplied to hydraulically actuate the plunger.

6. The fuel system of claim 5 wherein said spill control means includes at least one spill port defined in the barrel and spill passage means defined in the plunger for intermittently communicating a portion of fuel from the pump chamber with the spill port during the pumping stroke of the plunger.

7. The fuel system of claim 6 wherein said plunger has a leading edge facing the fuel pump chamber, said spill passage means including an outer circumferential groove defined in and encircling the plunger, said groove being spaced from the leading edge of the plunger and arranged to be in intermittent fluid communication with the spill port of the barrel during the pumping stroke of the plunger.

8. The fuel system of claim 7 wherein said spill passage means further includes at least one internal passage defined in the plunger, said groove intersecting the internal passage, said internal passage arranged in continuous fluid communication between the groove and the fuel pump chamber.

9. A hydraulically-actuated electronically-controlled injector fuel system adapted for an engine comprising:
    an injector having a barrel and a hydraulically-actuated fuel pump plunger positioned in a bore of the barrel, said plunger and barrel defining a fuel pump chamber, said plunger adapted to be hydraulically actuated by the actuating fluid; and
    means for varying the initial rate of fuel injection during an injection cycle independent of engine speed and loading wherein said initial fuel rate varying means includes spill control means for temporarily spilling fuel from the fuel pump chamber during a pumping stroke of the plunger and means for variably controlling the magnitude of the pressure of the actuating fluid supplied to hydraulically actuate the plunger, said spill control means including at least one spill port defined in the barrel and spill passage means defined in the plunger for intermittently communicating a portion of fuel from the pump chamber with the spill port during the pumping stroke of the plunger, said plunger having a leading edge facing the fuel pump chamber, said spill passage means including an outer circumferential groove defined in and encircling the plunger, said groove being spaced from the leading edge of the plunger and arranged to be in intermittent fluid communication with the spill port of the barrel during the pumping stroke of the plunger, said plunger having a central axis, said spill passage means further including a plurality of internal axial passages defined in the plunger and spaced from one another about an imaginary circle concentric with the plunger central axis, said groove intersecting each of the internal axial passages, said internal axial passages arranged in continuous fluid communication between the groove and the fuel pump chamber.

10. The fuel system of claim 7 wherein said spill passage means includes a single internal central passage and at least one radially-extending passage defined in the plunger, said central passage arranged in continuous fluid communication between the fuel pump chamber and the radial passage, said radial passage intersecting the central passage and arranged to be in continuous fluid communication with the groove.

11. A hydraulically-actuated electronically-controlled injector fuel system adapted for an engine comprising:
    an injector having a barrel and a hydraulically-actuated fuel pump plunger positioned in a bore of the barrel, said plunger and barrel defining a fuel pump chamber, said plunger adapted to be hydraulically actuated by the actuating fluid; and
    means for varying the initial rate of fuel injection during an injection cycle independent of engine speed and loading wherein said initial fuel rate varying means includes spill control means for temporarily spilling fuel from the fuel pump chamber during a pumping stroke of the plunger and means for variably controlling the magnitude of the pressure of the actuating fluid supplied to hydraulically actuate the plunger, said spill control means including at least one spill port defined in the barrel and spill passage means defined in the plunger for intermittently communicating a portion of fuel from the pump chamber with the spill port during the pumping stroke of the plunger, said plunger having a leading edge facing the fuel pump chamber, said spill passage means including an outer circumferential groove defined in and encircling the plunger, said groove being spaced from the leading edge of the plunger and arranged to be in intermittent fluid communication with the spill port of the barrel during the pumping stroke of the plunger, wherein said groove is a first groove, said spill passage means further including another outer circumferential groove defined in and encircling the plunger, said another groove positioned between the first groove and the leading edge of the plunger, said another groove arranged to communicate the fuel pump chamber with the spill port when the plunger begins its pumping stroke.

12. The fuel system of claim 7 wherein said spill passage means further includes a chamfer defined at the leading edge of the plunger, said chamfer arranged to communicate the fuel pump chamber with the spill port when the plunger begins its pumping stroke.

13. The fuel system of claim 7 wherein said spill passage means further includes at least one outer peripheral axial slot defined in the plunger and intersecting the groove, said slot being spaced from the spill port and arranged to be in continuous fluid communication between the fuel pump chamber and the groove.

14. A hydraulically-actuated electronically-controlled injector fuel system adapted for an engine comprising:

an injector having a hydraulic control valve, a barrel and a hydraulically-actuated fuel pump plunger positioned in a bore of the barrel, said plunger and barrel defining a fuel pump chamber, said hydraulic control valve selectively communicating actuating fluid to the plunger for hydraulic actuation thereof; and means for varying the initial rate of fuel injection during an injection cycle independent of engine speed and loading, said initial fuel rate varying means including spill control means for temporarily spilling fuel from the fuel pump chamber during a pumping stroke of the plunger and means for variably controlling the magnitude of the pressure of the actuating fluid supplied to hydraulically actuate the plunger, said variable pressure control means positioned upstream of the hydraulic control valve.

15. The fuel system of claim 14 wherein said variable pressure control means includes an actuating fluid sump, a fixed-displacement actuating fluid pump arranged in fluid communication with the sump, an electronically-controlled proportional pressure control valve, and a manifold arranged in fluid communication between the pump and the hydraulic control valve of the injector, said proportional pressure control valve arranged to control the actuating fluid pressure in the manifold by selectively communicating a variable amount of actuating fluid from the pump to the manifold and bypassing a variable amount of actuating fluid from the pump to the sump.

16. The fuel system of claim 14 wherein said variable pressure control means includes an actuating fluid sump, a variable-displacement actuating fluid pump arranged in fluid communication with the sump, and a manifold arranged in fluid communication between the pump and the hydraulic control valve of the injector, said variable-displacement pump arranged to communicate a variable amount of actuating fluid to the manifold.

17. A hydraulically-actuated electronically-controlled injector adapted for an engine having means for variably controlling the magnitude of the pressure of actuating fluid supplied to the injector, comprising:

an injector having a barrel and a hydraulically-actuatable fuel pump plunger positioned in a bore of the barrel, said plunger and barrel defining a fuel pump chamber; and means for infinitely varying the initial rate of fuel injection during an injection cycle independent of engine speed and loading wherein said initial fuel rate varying means includes spill control means for temporarily spilling fuel from the fuel pump chamber during a pumping stroke of the plunger, said spill control means including at least one spill port defined in the barrel and spill passage means defined in the plunger for intermittently communicating a portion of fuel from the pump chamber with the spill port during the pumping stroke of the plunger, said plunger having a leading edge facing the fuel pump chamber, said spill passage means including an outer circumferential groove defined in and encircling the plunger, said groove being spaced from the leading edge of the plunger and arranged to be in intermittent fluid communication with the spill port of the barrel during the pumping stroke of the plunger, said plunger having a central axis, said spill passage means further including a plurality of internal axial passages defined in the plunger and spaced from one another about an imaginary circle concentric with the plunger central axis, said groove intersecting each of the internal axial passages, said internal axial passages arranged in continuous fluid communication between the groove and the fuel pump chamber.

18. A hydraulically-actuated electronically-controlled injector fuel system adapted for an engine comprising:

an injector having a barrel and a hydraulically-actuated fuel pump plunger positioned in a bore of the barrel, said plunger and said barrel defining a fuel pump chamber, said plunger adapted to be hydraulically actuated by pressurized actuating fluid; and means for variably providing one of continuous and split injection during a fuel injection cycle independent of engine speed and loading, said means including a spill control means having a spill port in the barrel and a spill passage means in the plunger, the relative location of the spill port and the spill passage means being such that the spill passage means temporarily communicates the pump chamber with the spill port between the beginning and ending of an injection cycle.

19. A hydraulically-actuated electronically-controlled injector fuel system adapted for an engine comprising:

an injector having a barrel and a hydraulically-actuated fuel pump plunger positioned in a bore of the barrel, said plunger and barrel defining a fuel pump chamber, said plunger adapted to be hydraulically actuated by pressurized actuating fluid;

means for varying the initial rate of fuel injection during an injection cycle independent of engine speed and loading, said means including a spill port in the barrel and means for communicating the pump chamber with the spill port after initiation of an injection cycle and before ending of the injection cycle.

* * * * *